No. 729,601.

Patented June 2, 1903.

UNITED STATES PATENT OFFICE.

MYRTIL KAHN, OF ELBERFELD, GERMANY, ASSIGNOR TO FARBENFABRIKEN OF ELBERFELD CO., OF NEW YORK, N. Y., A CORPORATION OF NEW YORK.

AZO DYE AND PROCESS OF MAKING SAME.

SPECIFICATION forming part of Letters Patent No. 729,601, dated June 2, 1903.

Application filed March 7, 1903. Serial No. 146,741. (No specimens.)

*To all whom it may concern:*

Be it known that I, MYRTIL KAHN, doctor of philosophy, chemist, residing at Elberfeld, Germany, (assignor to the FARBENFABRIKEN OF ELBERFELD CO., of New York,) have invented a new and useful Improvement in Monoazo Coloring-Matter; and I do hereby declare the following to be an exact and clear description of my invention.

My invention relates to the production of new and valuable azo dyestuffs by combining the diazo compounds of ortho-amidophenol sulfonic acids having the general formula:

(X meaning a hydrogen atom which can be replaced by halogens—$NO_2$, —$SO_3H$, or —$CH_3$)— such as ortho-amidophenol sulfonic acids, ortho-amidocresol sulfonic acids, ortho-amidophenol-nitro-sulfonic acids, ortho-amidophenol-chloro-sulfonic acids, ortho-amidophenol disulfonic acids, or the like— with 1:5-amidonaphthol having the formula:

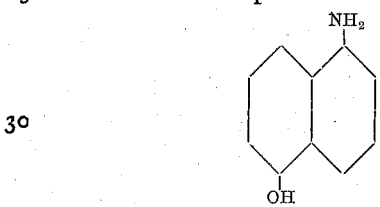

The new azo dyestuffs thus obtained are brownish-black powders soluble in water with from a reddish-violet to bluish-violet color and dyeing wool from acid-baths from violet to brownish-violet shades, turning black by a subsequent treatment with chromium compounds reacting as oxidizing agents. The black shades thus obtained possess a great fastness to the "potting process," which is a finishing process for woolen piece goods. In this process the goods are entered into boiling water and allowed to remain there until the water is cold. The goods thus assume a high degree of gloss and softness, and, according to the effect desired, the "potting" may be repeated several times.

In carrying out my process practically I can proceed as follows, the parts being by weight:

Nineteen parts of ortho-amidophenol-para-sulfonic acid having the formula:

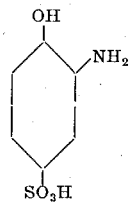

are diazotized in the usual manner, and the resulting diazo compound is stirred into a solution of 15.9 parts of 1:5-amidonaphthol in an excess of caustic-soda lye, care being taken that the mixture is always alkaline during the reaction. After being stirred for some time the excess of caustic-soda lye is neutralized by means of hydrochloric acid and the new dyestuff is precipitated by the addition of common salt, filtered off, and dried.

The new coloring-matter thus obtained is in the shape of the sodium salt when dry and pulverized a brownish-black powder soluble in water and in alcohol to a reddish-violet solution and soluble in concentrated sulfuric acid of 66° Baumé to a violet-red solution, a brownish-red precipitate being obtained therefrom by the addition of ice. It dyes wool from acid-baths brownish-violet shades. By subsequently treating the dyed fiber with chromium compounds reacting as oxidizing agents—such as chromates, bichromates, or the like—the shades are changed to black, distinguished for great fastness to the potting process. They also resist milling and washing and possess a great fastness against the action of light.

Having now described my invention, what I claim is—

1. The herein-described new azo dyestuffs derived from ortho-amidophenol derivatives having the above-given formula and 1:5-amidonaphthol which, when in a dry state, are brownish-black powders soluble in water with from a reddish-violet to bluish-violet color and dyeing wool from acid-baths from violet to brownish-violet shades turning black by a subsequent treatment with chromium compounds reacting as oxidizing agents, substantially as hereinbefore described.

2. The herein-described new azo dyestuffs derived from ortho-amidophenol-para-sulfonic acid having the above-given formula and 1:5-amidonaphthol, which, in the shape of the sodium salt, is a brownish-black powder soluble in water and in alcohol with a reddish-violet color; soluble in concentrated sulfuric acid of 66° Baumé with a violet-red color, a brownish-red precipitate being obtained therefrom by addition of ice; dyeing wool from acid-baths brownish-violet shades which are changed to black by a subsequent treatment with chromium compounds reacting as oxidizing agents, substantially as described.

In testimony whereof I have signed my name in the presence of two subscribing witnesses.

MYRTIL KAHN.

Witnesses:
OTTO KÖNIG,
J. A. RITTERSHAUS.